(12) United States Patent
Takami et al.

(10) Patent No.: US 8,951,693 B2
(45) Date of Patent: Feb. 10, 2015

(54) MEMBRANE ELECTRODE ASSEMBLY AND FUEL CELL

(71) Applicant: Eneos Celltech Co., Ltd., Ora-gun (JP)

(72) Inventors: Hirofumi Takami, Ora-gun (JP); Shigeru Sakamoto, Ora-gun (JP)

(73) Assignee: JX Nippon Oil & Energy Corporation, Chiyoda-Ku, Tokyo (JP)

( * ) Notice: Subject to any disclaimer, the term of this patent is extended or adjusted under 35 U.S.C. 154(b) by 307 days.

(21) Appl. No.: 13/630,570

(22) Filed: Sep. 28, 2012

(65) Prior Publication Data

US 2013/0029247 A1 Jan. 31, 2013

Related U.S. Application Data

(63) Continuation of application No. PCT/JP2011/001856, filed on Mar. 29, 2011.

(30) Foreign Application Priority Data

Mar. 31, 2010 (JP) ................................ 2010-084587

(51) Int. Cl.
*H01M 4/86* (2006.01)
*H01M 8/10* (2006.01)
(Continued)

(52) U.S. Cl.
CPC .............. *H01M 4/86* (2013.01); *H01M 4/0416* (2013.01); *H01M 4/96* (2013.01); *H01M 4/92* (2013.01);
(Continued)

(58) Field of Classification Search
CPC ... H01M 8/1004; H01M 8/10; H01M 4/0416; H01M 4/86; H01M 4/92; H01M 4/96
See application file for complete search history.

(56) References Cited

U.S. PATENT DOCUMENTS 6,541,150 B1 * 4/2003 Xie et al. ...................... 429/480
6,991,870 B2 * 1/2006 Yasumoto et al. ............ 429/457

(Continued)

FOREIGN PATENT DOCUMENTS

CN          1457521 A     11/2003
CN        101180756 A      5/2008
(Continued)

OTHER PUBLICATIONS

Chinese Office Action dated Jun. 26, 2014 issued in corresponding Chinese Patent Appln. No. 201180017075.5, with English translation (15 pages).

(Continued)

*Primary Examiner* — Jeremiah Smith
(74) *Attorney, Agent, or Firm* — Buchanan Ingersoll & Rooney PC

(57) ABSTRACT

There is provided a membrane electrode assembly including an anode gas diffusion layer included in an anode and a cathode gas diffusion layer included in a cathode, wherein the anode gas diffusion layer includes an anode gas diffusion substrate and an anode microporous layer disposed on a first surface of the anode gas diffusion substrate, wherein the cathode gas diffusion layer includes a cathode gas diffusion substrate and a cathode microporous layer disposed on a first surface of the cathode gas diffusion substrate, and wherein at least one of a strike-through ratio on a second surface of the anode gas diffusion substrate and a strike-through ratio on a second surface of the cathode gas diffusion substrate is larger than 0.2%.

3 Claims, 6 Drawing Sheets

(51) Int. Cl.
*H01M 8/02* (2006.01)
*H01M 4/04* (2006.01)
*H01M 4/96* (2006.01)
*H01M 4/92* (2006.01)

(52) U.S. Cl.
CPC ............ *H01M 8/1004* (2013.01); *Y02E 60/521* (2013.01); *H01M 8/10* (2013.01); *H01M 8/02* (2013.01)
USPC .......................................... 429/482; 429/481

(56) References Cited

U.S. PATENT DOCUMENTS

| | | | |
|---|---|---|---|
| 7,492,054 B2* | 2/2009 | Catlin | 290/54 |
| 2009/0068530 A1* | 3/2009 | Hiraoka et al. | 429/33 |
| 2009/0220845 A1* | 9/2009 | Mittelsteadt et al. | 429/33 |
| 2010/0107404 A1* | 5/2010 | Yoshizawa et al. | 29/623.5 |
| 2011/0290727 A1* | 12/2011 | Van Engelen | 210/650 |
| 2012/0328929 A1* | 12/2012 | Matsumoto et al. | 429/144 |

FOREIGN PATENT DOCUMENTS

| | | |
|---|---|---|
| JP | 2003-109604 A | 4/2003 |
| JP | 2003-282079 A | 10/2003 |
| JP | 2003282079 A | 10/2003 |
| JP | 2005-078975 A | 3/2005 |
| JP | 2006-269130 A | 10/2006 |
| JP | 2009-016055 A | 1/2009 |
| JP | 2009-181718 A | 8/2009 |

OTHER PUBLICATIONS

International Search Report (Form PCT/ISA/210) issued on Jun. 7, 2011, in the corresponding International Application No. PCT/JP2011/001856 and an English translation thereof. (4 pages).

International Preliminary Report on Patentability (Form PCT/IB/373) and the Written Opinion of the International Searching Authority (Form PCT/ISA/237) issued on Oct. 2, 2012, in the corresponding International Application No. PCT/JP2011/001856. (4 pages).

English language translation of International Preliminary Report on Patentability (Form PCT/IB/373) and the Written Opinion of the International Searching Authority (Form PCT/ISA/237) issued on Nov. 13, 2012, in the corresponding International Application No. PCT/JP2011/001856. (5 pages).

* cited by examiner

MEMBRANE ELECTRODE ASSEMBLY AND FUEL CELL

CROSS-REFERENCE TO RELATED APPLICATIONS

This application is a continuation of International Application No. PCT/JP2011/001856, whose international filing date is Mar. 29, 2011 which in turn claims the benefit of Japanese Patent Application No. 2010-084587, filed on Mar. 31, 2010, the disclosures of which Applications are incorporated by reference herein.

BACKGROUND OF THE INVENTION

1. Field of the Invention

The present invention relates to a fuel cell which generates electricity through an electrochemical reaction of hydrogen and oxygen.

2. Description of the Related Art

Recently, fuel cells having high energy conversion efficiency and generating no toxic substances through an electricity generation reaction have attracted attention. As one of the fuel cells, there has been known a solid polymer type fuel cell which is allowed to operate at a low temperature of 100° C. or less.

The solid polymer type fuel cell is a device having a basic structure where a solid polymer membrane as an electrolyte membrane is disposed between a fuel electrode and an air electrode and allowing a fuel gas including hydrogen to be supplied to the fuel electrode and allowing an oxidant gas including oxygen to be supplied to the air electrode to generate electricity through the following electrochemical reaction.

Fuel Electrode: $H_2 \rightarrow 2H^+ + 2e^-$      (1)

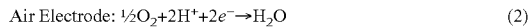

Air Electrode: $\frac{1}{2}O_2 + 2H^+ + 2e^- \rightarrow H_2O$      (2)

Each of the anode and the cathode is configured with a structure where a catalyst layer and a gas diffusion layer (GDL) are stacked. The fuel cell is configured so that the catalyst layers of the electrodes are disposed to face each other with the solid polymer membrane interposed therebetween. The catalyst layer is a layer where carbon particles carrying catalyst are bound by an ion exchange resin. The gas diffusion layer becomes a passage of the oxidant gas or the fuel gas.

In the anode, the hydrogen included in the supplied fuel is decomposed into hydrogen ions and electrons as expressed by the above Formula (1). Among them, the hydrogen ions move through an inner portion of the solid polymer electrolyte membrane toward the air electrode, and electrons move through an external circuit toward the air electrode. On the other hand, in the cathode, the oxygen included in the oxidant gas supplied to the cathode react with the hydrogen ions and electrons moved from the fuel electrode to generate water as expressed by the above Formula (2). In this manner, since electrons move from the fuel electrode toward the air electrode in the external circuit, power is extracted.

For example, Patent Document 1 discloses a gas diffusion electrode for a fuel cell where an amount of a water repellant in a porous substrate is continuously changed from a side which is in contact with a catalyst layer toward the other side. In addition, Patent Document 2 discloses a technique for suppressing excessive immersion of a fluid material at a first exposed surface of a substrate in a thickness direction of the substrate by allowing a half or more of a second exposed surface of the substrate not to be in contact with a supporting member or by allowing a supporting surface of the supporting member to have a water repelling property in a gas diffusion layer.

CITATION LIST

Patent Document

[Patent Document 1] Japanese Patent Application Laid-Open No. 2003-109604
[Patent Document 2] Japanese Patent Application Laid-Open No. 2009-181718

SUMMARY OF THE INVENTION

In a gas diffusion layer of a fuel cell, with respect to water and gas generated through an electrochemical reaction, water exhaustion property and gas diffusivity need to be simultaneously satisfied. However, in a fuel cell in the related art, water exhaustion path in a gas diffusion layer is not sufficiently secured, and the water exhaustion property and the gas diffusivity in the gas diffusion layer are not simultaneously satisfied.

For example, in the fuel cells disclosed in Cited Documents 1 and 2, carbon paths which are formed in the gas diffusion layer as exhaustion paths of the generated water generated through the electrochemical reaction are not quantitatively considered.

The present invention is made in view of such circumstances, and an object is to provide a fuel cell capable of simultaneously satisfying water exhaustion property and gas diffusivity and improving a voltage characteristic.

To solve the above-described problems, a membrane electrode assembly according to an aspect of the present invention includes: an electrolyte membrane; an anode which is disposed on one surface of the electrolyte membrane; and a cathode which is disposed on the other surface of the electrolyte membrane, wherein the anode includes an anode catalyst layer and an anode gas diffusion layer in this order from the electrolyte membrane side, the cathode includes a cathode catalyst layer and a cathode gas diffusion layer in this order from the electrolyte membrane side, the anode gas diffusion layer includes an anode gas diffusion substrate and an anode microporous layer which is disposed in a form where the anode microporous layer partially permeates from a first surface of the anode gas diffusion substrate in a thickness direction of the anode gas diffusion substrate and which contains a conductive powder, the cathode gas diffusion layer includes a cathode gas diffusion substrate and a cathode microporous layer which is disposed in a form where the cathode microporous layer partially permeates from a first surface of the cathode gas diffusion substrate in a thickness direction of the cathode gas diffusion substrate and which contains a conductive powder, and at least one of a strike-through ratio which is a ratio of occupation of a total area of a strike-through region of the anode microporous layer formed in a dotted form by allowing a portion of the anode microporous layer to reach a second surface of the anode gas diffusion substrate at the side opposite to a first surface of the anode gas diffusion substrate in the anode gas diffusion layer over an area of the second surface of the anode gas diffusion substrate, and a strike-through ratio which is a ratio of occupation of a total area of a strike-through region of the cathode microporous layer formed in a dotted form by allowing a portion of the cathode microporous layer to reach a second surface of the cathode gas diffusion substrate at the side opposite to a first surface of the cathode gas diffusion substrate in the cathode gas diffusion layer over an area of the second surface of the cathode gas diffusion substrate, is larger than 0.2%.

According to the above aspect of the present invention, since the strike-through of the microporous layer of the gas diffusion layer is performed so as to reach the other surface of the gas diffusion substrate, the water generated through the electrochemical reaction can be exhausted to the separator side by using the strike-through portion in the microporous layer as a center. It is considered that the carbon in the microporous layer constitutes a carbon path, so that the generated water exhaustion is effectively performed. In addition, the strike-through ratio of the microporous layer is a predetermined ratio, so that it is possible to simultaneously satisfy the generated water exhaustion and the gas diffusivity while the gas diffusivity of the gas diffusion layer is maintained. In addition, the strike-through region is formed in a dotted form, so that the generated water exhaustion can be uniformly performed over the entire gas diffusion layer, so that it is possible to further improve the generated water exhaustion property. Accordingly, it is possible to improve the voltage characteristic of the fuel cell.

In the above aspect of the present invention, in the membrane electrode assembly, the strike-through ratio may be in a range of 0.3% to 3.9%. According to the above aspect of the present invention, it is possible to further improve the exhaustion property of the gas diffusion layer and the voltage characteristic of the fuel cell.

In the above aspect of the present invention, in the membrane electrode assembly, the strike-through ratio may be in a range of 0.4% to 3.1%. According to the above aspect of the present invention, it is possible to further improve the exhaustion property of the gas diffusion layer and the voltage characteristic of the fuel cell.

According to another aspect of the present invention, there is provided a fuel cell. The fuel cell includes the membrane electrode assembly according to the above aspect of the present invention. According to the above aspect of the present invention, it is possible to improve the exhaustion property of the gas diffusion layer and the voltage characteristic of the fuel cell.

In addition, although the gas diffusion layer where the strike-through of the microporous layer is performed at a predetermined ratio may be appropriately used for the cathode in terms of exhaustion of generated water, the gas diffusion layer may also be used for the anode.

According to a fuel cell of the present invention, it is possible to improve a voltage characteristic.

DETAILED DESCRIPTION OF THE INVENTION

Figure 1:
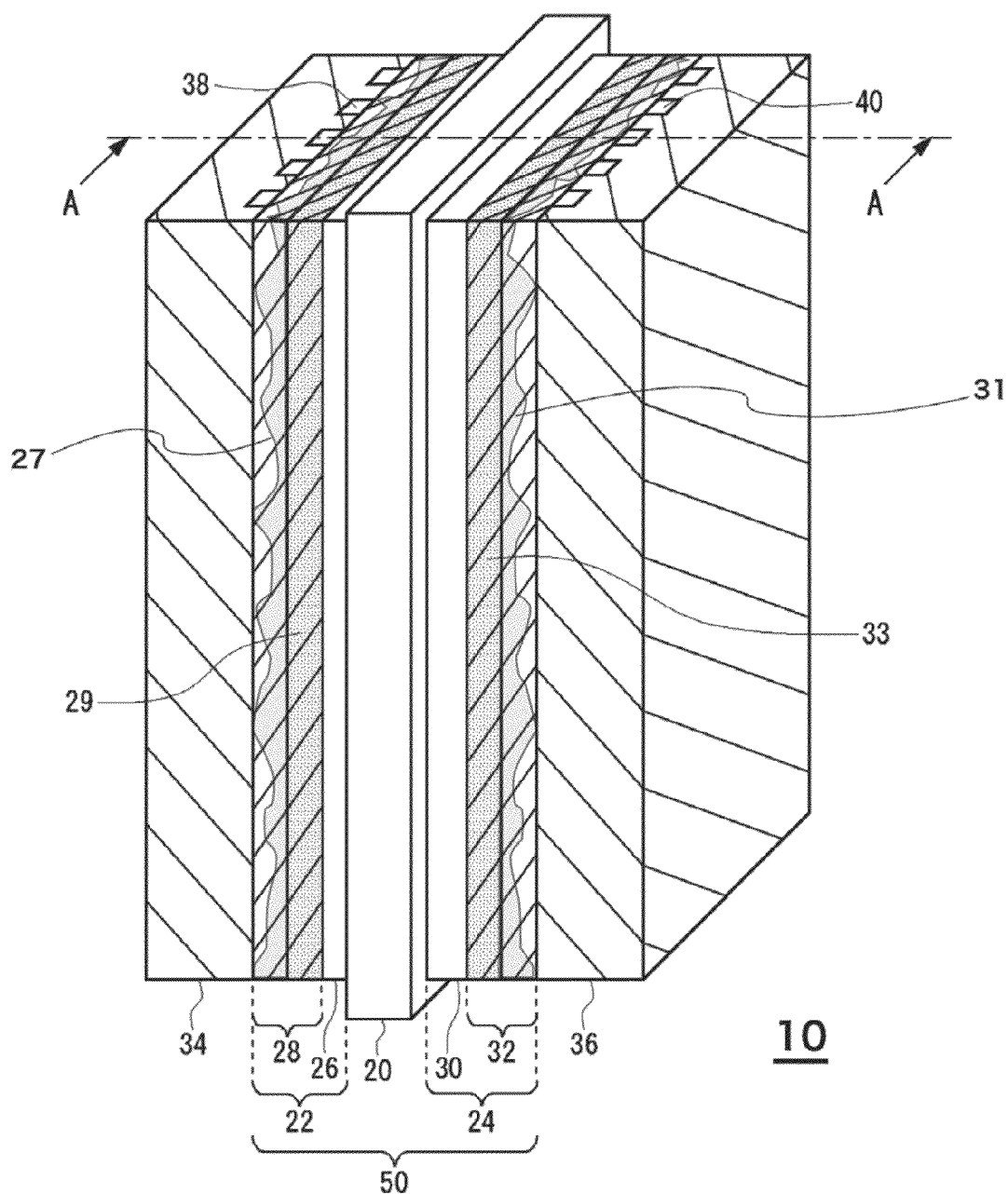
FIG. 1 is a perspective view schematically illustrating a structure of a fuel cell according to an embodiment.

Hereinafter, embodiments of the present invention will be described with reference to the drawings. In addition, in the entire drawings, the same components are denoted by the same reference numerals, and the description thereof is not repeated.

Embodiment

Figure 2:
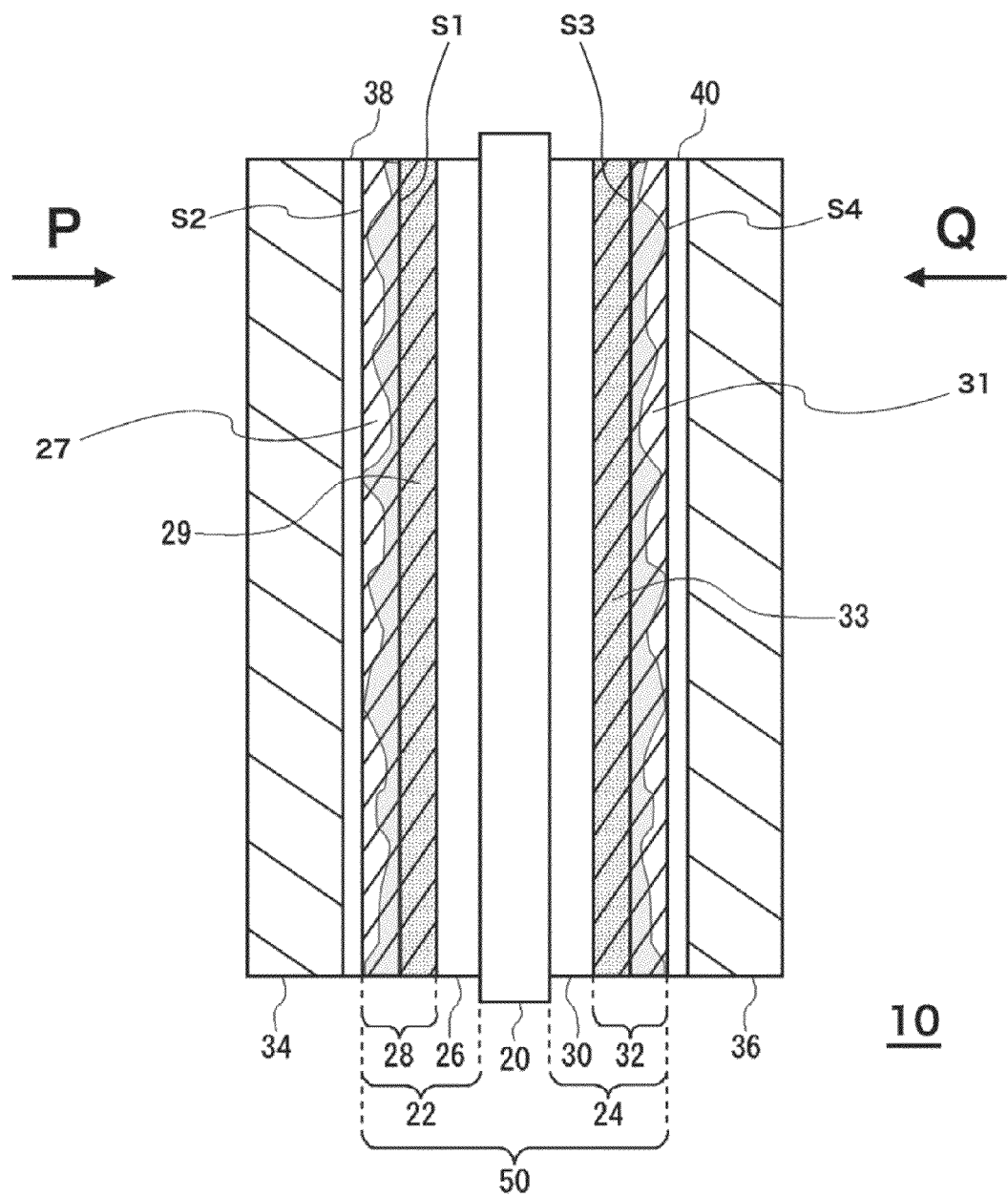
FIG. 2 is a cross-sectional view taken along line A-A of FIG. 1.

FIG. 1 is a perspective view schematically illustrating a structure of a fuel cell 10 according to a first embodiment. FIG. 2 is a cross-sectional view taken along line A-A of FIG. 1. The fuel cell 10 includes a plate-shaped membrane electrode assembly 50, and a separator 34 and a separator 36 are installed at two sides of the membrane electrode assembly 50. In this example, although only one membrane electrode assembly 50 is illustrated, a fuel cell stack may be configured by stacking a plurality of membrane electrode assemblies 50 through the separators 34 or the separators 36. The membrane electrode assembly 50 includes a solid polymer electrolyte membrane 20, an anode 22, and a cathode 24.

The anode 22 includes a stack structure configured with a catalyst layer 26 and a gas diffusion layer 28. On the other hand, the cathode 24 includes a stack structure configured with a catalyst layer 30 and a gas diffusion layer 32. The catalyst layer 26 of the anode 22 and the catalyst layer 30 of the cathode 24 are installed to face each other with the solid polymer electrolyte membrane 20 interposed therebetween.

A gas passage 38 is installed in the separator 34 installed at the anode 22 side. A fuel gas from a fuel-supplying manifold (not illustrated) is distributed to the gas passage 38, and the fuel gas is supplied through the gas passage 38 to the membrane electrode assembly 50. Similarly, a gas passage 40 is installed in the separator 36 installed at the cathode 24 side.

An oxidant gas from an oxidant-supplying manifold (not illustrated) is distributed to the gas passage 40, and an oxidant gas is supplied through the gas passage 40 to the membrane electrode assembly 50. More specifically, during operation of the fuel cell 10, the fuel gas, for example, the reformed gas containing hydrogen gas passes through the gas passage 38 along the surface of the gas diffusion layer 28 from the upper side to the lower side, so that the fuel gas is supplied to the anode 22.

On the other hand, during operation of the fuel cell 10, the oxidant gas, for example, the air passes through the gas passage 40 along the surface of the gas diffusion layer 32 from the upper side to the lower side, so that the oxidant gas is supplied to the cathode 24. Therefore, a reaction occurs in the membrane electrode assembly 50. If the hydrogen gas is supplied through the gas diffusion layer 28 to the catalyst layer 26, protons are generated from hydrogen in the gas, and the protons move through the solid polymer electrolyte membrane 20 to the cathode 24 side. At this time, emitted electrons move to an external circuit and flow from the external circuit into the cathode 24. On the other hand, if the air is supplied through the gas diffusion layer 32 to the catalyst layer 30, oxygen and protons are coupled with each other to form water. As a result, in the external circuit, the electrons flow from the anode 22 to the cathode 24, so that power can be extracted.

The solid polymer electrolyte membrane 20 has good ion conductivity in a wet state and serves as an ion exchange membrane of allowing protons to move between the anode 22 and the cathode 24. The solid polymer electrolyte membrane 20 is made of a solid polymer material such as a fluoro-containing polymer or a non-fluoropolymer. For example, a sulfonic acid type perfluoro carbon polymer, a polysulphone resin, a perfluoro carbon polymer having a phosphoric acid group or a carboxylic acid group, or the like may be used. As an example of the sulfonic acid type perfluoro carbon polymer, there is Nafion (manufactured by DuPont: registered trade mark) 112, or the like. In addition, as an example of the non-fluoropolymer, there is a sulfonated, aromatic polyether ether ketone, polysulphone, or the like. A typical thickness of the solid polymer electrolyte membrane 20 is 50 μm.

The catalyst layer 26 constituting the anode 22 is configured with an ion conductor (ion exchange resin) and carbon particles carrying metal catalysts, that is, catalyst-carrying carbon particles. A typical thickness of the catalyst layer 26 is 10 μm. The ion conductor has a function of allowing the carbon particles carrying alloy catalysts and the solid polymer electrolyte membrane 20 to be in contact with each other and allowing protons to be transferred therebetween. The ion conductor may be made of the same polymer material as that of the solid polymer electrolyte membrane 20.

As an example of the metal catalyst used for the catalyst layer 26, there is an alloy catalyst made of, for example, noble metal and ruthenium. As an example of the noble metal used for the alloy catalyst, there is, for example, platinum, palladium, or the like. In addition, as an example of the carbon particles carrying the metal catalyst, there is acetylene black, Ketjen black, carbon nano tube, carbon nano onion, or the like.

The gas diffusion layer 28 constituting the anode 22 includes a gas diffusion substrate 27 and a microporous layer 29 (MPL) which is coated on the gas diffusion substrate. The gas diffusion substrate 27 is preferably configured with a pore structure having electron conductivity, and for example, carbon paper, carbon woven fabric, carbon nonwoven fabric, or the like may be used.

The microporous layer 29 coated on the gas diffusion substrate 27 is a kneading material (paste) which is obtained by kneading a conductive powder and a water repellent. As an example of the conductive powder, for example, carbon black may be used. In addition, as an example of the water repellent, a tetrafluoro ethylene resin (PTFE), a fluorine-based resin such as tetrafluoro ethylene hexafluoro propylene copolymer (FEP), or the like may be used. In addition, the water repellent preferably has a binding property. Herein, the binding property denotes a property where a material having a low viscosity is bound to an easily breaking material so that the material is changed into a viscous state. Since the water repellent has the binding property, the paste can be obtained by kneading the conductive powder and the water repellent.

The microporous layer 29 is coated on a first surface 51 (front surface), and strike-through is performed in a form where a predetermined amount partially permeates in the thickness direction to a second surface S2 (rear surface), so that the gas diffusion layer 28 having an appropriate strike-through ratio (%) is formed. The strike-through denotes a phenomenon where the microporous layer coated on the first surface (front surface) at the solid polymer electrolyte membrane 20 side of the gas diffusion substrate reaches the second surface (rear surface) which is the surface on the opposite side. The strike-through ratio (%) denotes a ratio of occupation of a total area of the strike-through region of the microporous layer formed in a dotted form over the area of the second surface of the gas diffusion substrate due to the reaching of the second surface. It is considered that the strike-through region constitutes a carbon path as an exhaustion path of generated water generated through an electrochemical reaction. Therefore, the strike-through region is formed so that the gas diffusivity of the gas diffusion layer 28 can be maintained, and a generated water exhaustion property of the gas diffusion layer 28 can be improved. In addition, the strike-through region is formed in a dotted form, so that generated water exhaustion can be uniformly performed over the entire gas diffusion layer 28, so that it is possible to further improve the generated water exhaustion property. A method of adjusting the strike-through ratio will be described below.

Figure 3:
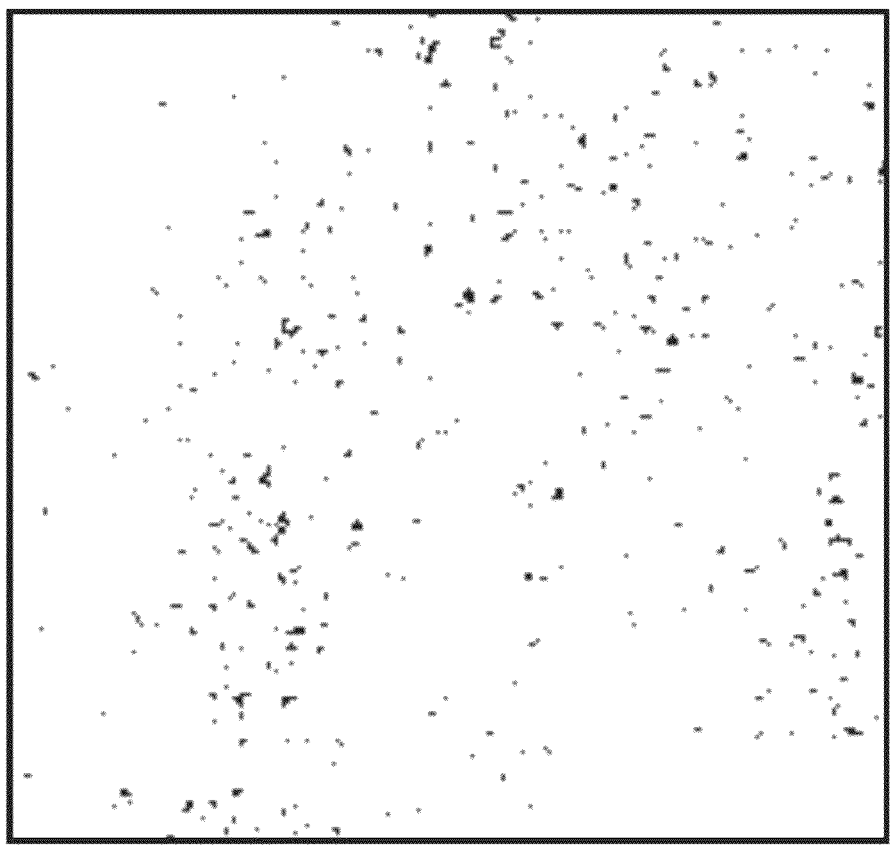
FIG. 3 is a diagram illustrating strike-through of a microporous layer on a rear surface of a gas diffusion layer.

FIG. 3 is a diagram illustrating the strike-through of the microporous layer on the rear surface (second surface S2) of the gas diffusion layer. Herein, an example where the second surface S2 of the gas diffusion layer 28 is observed from the side opposite to the first surface S1 which is coated with the microporous layer 29 of the gas diffusion substrate 27, that is, the arrow P side of FIG. 2 is illustrated. In the case where the second surface S4 of the later-described gas diffusion layer 32 constituting the cathode 24 is viewed from the arrow Q side, the strike-through formed by the microporous layer 33 is similarly observed.

In FIG. 3, the region where dots are formed is the strike-through region of the microporous layer 29. It is considered that, in the strike-through region, carbon in the microporous layer 29 constitutes an exhaustion path of water generated through the electrochemical reaction. Therefore, the strike-through region is formed in the gas diffusion layer 28, so that the generated water in the catalyst layer 26 can be effectively exhausted to the separator 34 side. In addition, the strike-through ratio (%) in the strike-through region is in an appropriate range, so that the generated water exhaustion property can be improved while the gas diffusivity of the gas diffusion layer 28 is maintained. Although the strike-through ratio on the rear surface (second surface) of the gas diffusion layer may be preferably equal to or larger than 0.2%, the strike-through ratio is more preferably in a range of about 0.3% to about 3.9%, most preferably, in a range of about 0.4 to about 3.1%. Therefore, it is possible to further improve the generated water exhaustion property and the voltage characteristic of the fuel cell 10.

Returning to FIGS. 1 and 2, the catalyst layer 30 constituting the cathode 24 is configured with an ion conductor (ion exchange resin) and carbon particles carrying catalysts, that is, catalyst-carrying carbon particles. The ion conductor has a function of allowing the carbon particles carrying catalysts and the solid polymer electrolyte membrane 20 to be in contact with each other and allowing protons to be transferred therebetween. The ion conductor may be made of the same polymer material as that of the solid polymer electrolyte membrane 20. As an example of the carried catalyst, for example, platinum or a platinum alloy may be used. As an example of a metal used for the platinum alloy, there is cobalt, nickel, iron, manganese, iridium, or the like. In addition, as an example of the carbon particle carrying the catalyst, there is acetylene black, Ketjen black, carbon nano tube, carbon nano onion, or the like.

The gas diffusion layer 32 constituting the cathode 24 includes a gas diffusion substrate 31 and a microporous layer 33 which is coated on the gas diffusion substrate 31. The gas diffusion substrate 31 is preferably configured with a pore structure having electron conductivity, and for example, carbon paper, carbon woven fabric, carbon nonwoven fabric, or the like may be used. In addition, by taking productivity into consideration, common carbon paper is preferably used as substrates of the gas diffusion layers 32 and 28.

The microporous layer 33 coated on the gas diffusion substrate 31 is a paste-state kneading material which is obtained by kneading a conductive powder and a water repellent, and is the same as the aforementioned microporous layer 29 coated on the gas diffusion substrate 27. In addition, similarly to the aforementioned microporous layer 29 coated on the gas diffusion substrate 27, the microporous layer 33 is coated on a front surface (first surface S3) of the solid polymer electrolyte membrane 20 side of the gas diffusion substrate 31, and strike-through of a predetermined amount is performed to the rear surface (second surface S4) which is the other surface. Similarly to the aforementioned case of the gas diffusion substrate 27, although the strike-through ratio on the rear surface (second surface) of the gas diffusion layer is preferably equal to or larger than about 0.2%, more preferably in a range of about 0.3 to about 3.9%, most preferably in a range of about 0.4 to about 3.1%. Therefore, it is possible to further improve the generated water exhaustion property and the voltage characteristic of the fuel cell 10.

According to the fuel cell 10 described hereinbefore, since the strike-through of the microporous layer of the gas diffusion layer is performed so as to reach the other surface of the gas diffusion substrate, the water generated through the electrochemical reaction can be exhausted to the separator side by using the strike-through portion in the microporous layer as a center. It is considered that, since the carbon in the microporous layer constitutes a carbon path, the generated water exhaustion can be effectively performed. In addition, since the strike-through ratio of the microporous layer is set to be a predetermined ratio, the generated water exhaustion and the gas diffusivity can be simultaneously satisfied while the gas diffusivity of the gas diffusion layer is maintained. In addition, since the strike-through region is formed in a dotted form, the generated water exhaustion can be uniformly performed over the entire gas diffusion layer 28, so that the generated water exhaustion property can be further improved. Therefore, the voltage characteristic of the fuel cell 10 can be improved.

In addition, in the aforementioned fuel cell 10, although the strike-through of the microporous layer is performed with respect to the gas diffusion substrates of both of the anode 22 and the cathode 24, the strike-through of the microporous layer may be performed in the aforementioned range with respect to only at least one gas diffusion substrate of the anode 22 and the cathode 24.

In order to form the microporous layer on the surface of the gas diffusion layer, various printing methods such as screening printing or offset printing may be appropriately used, on the other hand, in order to adjust the strike-through ratio, for example, a combination of the following Method 1 or 2 of adjusting strike-through ratio with the printing methods may be used.

(Method 1 of Adjusting Strike-Through Ratio)

Figure 4:
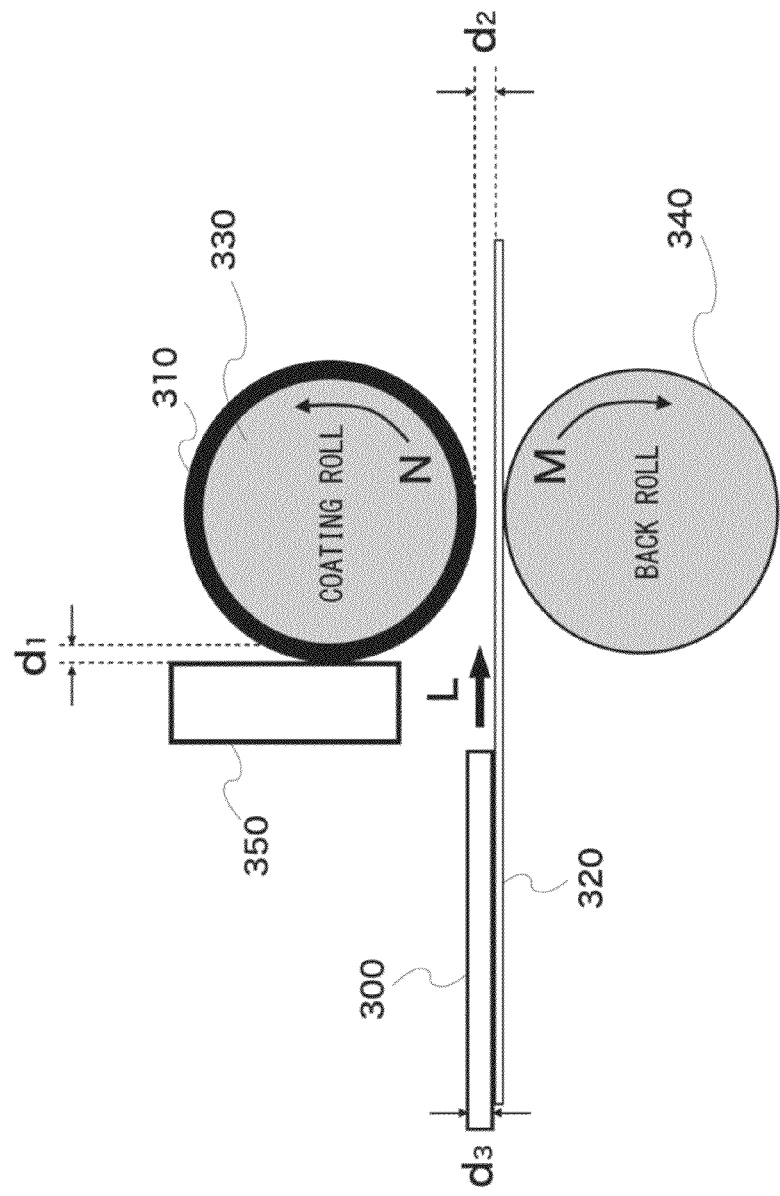
FIG. 4 is a diagram illustrating a method of adjusting a strike-though ratio of a microporous layer on a rear surface of a gas diffusion layer by roll coater coating.

FIG. 4 is a diagram illustrating a method of adjusting the strike-though ratio of the microporous layer on the rear surface (second surface) of the gas diffusion layer by roll coater coating. The adjusting method may be used in combination with, for example, offset printing. Herein, although a method of adjusting the strike-through ratio by coating a gas diffusion substrate 300 constituting the anode with a paste 310 for forming the microporous layer is illustrated, the method can be similarly used to the case of coating a gas diffusion substrate constituting the cathode with a paste for forming the microporous layer.

The gas diffusion substrate 300 is loaded on a transporting plate 320, and a back roll 340 which is in contact with the transporting plate 320 is allowed to rotate in a direction of the arrow M, so that the gas diffusion substrate 300 is transported rightwards (in the direction of the arrow L). A coating roll 330 is installed above the back roll 340 in the vertical direction thereof. The paste 310 for forming the microporous layer is coated on the surface of the coating roll 330. The superfluous paste 310 coated on the surface of the coating roll 330 is removed by a doctor bar 350. In addition, a distance $d_2$ (clearance) between the lower end of the coating roll 330 in the state where the paste 310 is coated thereon and the upper end of the transporting plate 320 is smaller than a thickness $d_3$ of the gas diffusion substrate 300. Therefore, when the gas diffusion substrate 300 is allowed to move in the direction of the arrow L by the transporting plate 320 to pass between the coating roll 330 rotating in the direction of the arrow N and the back roll 340 rotating in the direction of the arrow M, the paste 310 coated on the coating roll 330 is transferred to the gas diffusion substrate 300. Therefore, the gas diffusion layer where the microporous layer is formed on the gas diffusion substrate 300 is manufactured. Although a material of the coating roll 330 and the back roll 340 is preferably urethane, stainless steel (SUS) may be used.

Herein, the strike-through ratio of the microporous layer on the second surface (rear surface: the surface which is in contact with the transporting plate 320) of the gas diffusion layer can be adjusted by changing a coated amount of the paste 310 on the gas diffusion substrate 300 or a pressing force of pressing the gas diffusion substrate 300 during the coating of the paste 310.

The coated amount of the paste 310 can be adjusted by changing a distance $d_1$ between the coating roll 330 and the doctor bar 350. More specifically, the coated amount is increased by increasing the distance $d_1$, so that the strike-through ratio of the microporous layer on the rear surface of the gas diffusion layer can be increased. On the contrary, the coated amount is decreased by decreasing the distance $d_1$, so that the strike-through ratio of the microporous layer on the rear surface of the gas diffusion layer can be decreased. In addition, if the amount of the paste 310 on the coating roll 330 is increased by increasing the distance $d_1$, the later-described distance $d_2$ is decreased, so that the pressing force on the gas diffusion substrate 300 is increased. In order to set the strike-through ratio of the microporous layer to be in the aforementioned range, in the case where the thickness $d_3$ of the gas diffusion substrate 300 is in a range of about 150 μm to about 230 μm, the distance $d_1$ is preferably in a range of about 80 μm to about 160 μm.

In addition, the pressing force on the gas diffusion substrate 300 can be adjusted by changing a distance $d_2$ between the lower end of the coating roll 330 in the state where the paste 310 is coated thereon and the upper end of the transporting plate 320. More specifically, the pressing force on the gas diffusion substrate 300 is increased by decreasing the distance $d_2$, so that the strike-through ratio of the microporous layer on the rear surface of the gas diffusion layer can be increased. On the contrary, the pressing force on the gas diffusion substrate 300 is decreased by increasing the distance $d_2$, so that the strike-through ratio of the microporous layer on the rear surface of the gas diffusion layer can be decreased. In order to set the strike-through ratio of the microporous layer to be in the aforementioned range, in the case where the thickness $d_3$ of the gas diffusion substrate 300 is in a range of about 150 μm to about 230 μm, the distance $d_2$ is preferably in a range of about 90 μm to about 170 μm.

In addition, only one of the distance $d_1$ and the distance $d_2$ may be adjusted, or both thereof may be adjusted. In addition, the pressing force may be adjusted by changing hardness (elasticity) of the surface of the coating roll 330.

(Method 2 of Adjusting Strike-Through Ratio)

Figure 5:
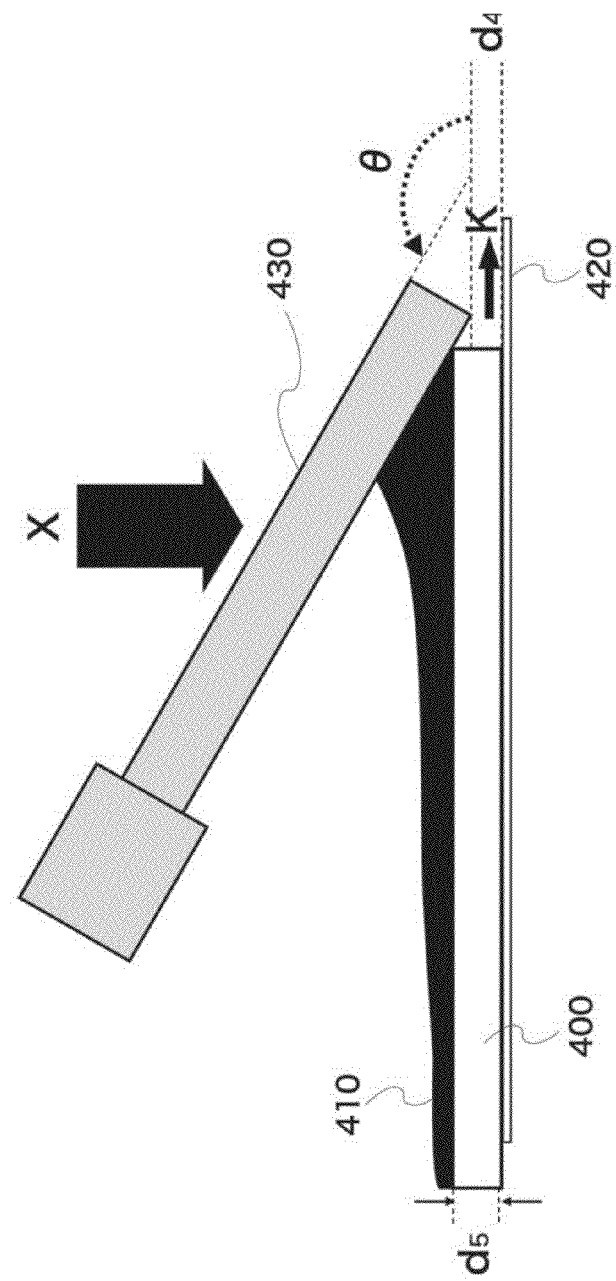
FIG. 5 is a diagram illustrating a method of adjusting a strike-though ratio of a microporous layer on a rear surface of a gas diffusion layer by squeegee coating.

FIG. 5 is a diagram illustrating a method of adjusting the strike-through ratio of the microporous layer on the rear surface of the gas diffusion layer by squeegee coating. The adjusting method may be used in combination with, for example, screen printing. Herein, although a method of adjusting the strike-through ratio by coating a gas diffusion substrate 400 constituting the anode with a paste 410 for forming the microporous layer is illustrated, the method can be similarly used to the case of coating a gas diffusion substrate constituting the cathode with a paste for forming the microporous layer.

The gas diffusion substrate 400 is loaded on a transporting plate 420 and transported rightwards (in the direction of the arrow K). Before the gas diffusion substrate 400 passes under a squeegee 430, the paste 410 is coated on the gas diffusion substrate 400. The squeegee 430 is installed above the transporting plate 420. The squeegee 430 is pressed in the downward direction by a squeegee pressure X so that a distance $d_4$ (clearance) between the lower end of the squeegee 430 and the upper end of the transporting plate 420 is smaller than a thickness $d_5$ of the gas diffusion substrate 400. Therefore, when the gas diffusion substrate 400 is allowed to move in the direction of the arrow K by the transporting plate 420 to pass through the gap between the lower end of the squeegee 430 and the transporting plate 420, the superfluous paste 410 is removed by the squeegee 430. Therefore, the gas diffusion layer where the microporous layer having a desired uniform thickness is formed on the first surface (front surface) of the gas diffusion substrate 400 is manufactured. Although a material of the squeegee 430 is preferably stainless steel (SUS), urethane may be used.

Herein the strike-through ratio of the microporous layer on the second surface (rear surface: the surface which is in contact with the transporting plate 420) of the gas diffusion layer can be adjusted by changing a pushing force of pushing the paste 410 toward the gas diffusion substrate 400 during the coating of the paste 410 or a removed amount of the paste 410 during the removing of the paste 410 from the gas diffusion substrate 400.

The removed amount of the paste 410 can be adjusted by adjusting a magnitude of the squeegee pressure X exerted to the squeegee 430 in the downward direction. More specifically, the pushing force on the gas diffusion substrate 400 is strengthened by increasing the squeegee pressure X, so that the strike-through ratio of the microporous layer on the rear surface of the gas diffusion layer can be increased. On the contrary, the pushing force on the gas diffusion substrate 400 is weakened by decreasing the squeegee pressure X, so that the strike-through ratio of the microporous layer on the rear surface of the gas diffusion layer can be decreased. In order to set the strike-through ratio of the microporous layer to be in the aforementioned range, in the case where a thickness $d_5$ of the gas diffusion substrate 400 is in a range from about 150 µm to about 230 µm, the squeegee pressure X is preferably in a range from about 0.2 to about 0.4 MPa. In addition, the squeegee pressure X is preferably an elastic force.

In addition, the pushing force on the gas diffusion substrate 400 can be adjusted by changing an angle θ (90°≤θ<180°) between the surface of the squeegee 430 and the surface of the transporting plate 420. More specifically, the pushing force on the gas diffusion substrate 400 is increased by increasing the angle θ (approaching 180°), so that the strike-through ratio of the microporous layer on the rear surface of the gas diffusion layer can be increased. On the contrary, the pushing force on the gas diffusion substrate 400 is decreased by decreasing the angle θ (approaching 90°), so that the strike-through ratio of the microporous layer on the rear surface of the gas diffusion layer can be decreased. In order to set the strike-through ratio of the microporous layer to be in the aforementioned range, in the case where a thickness $d_5$ of the gas diffusion substrate 400 is in a range from about 150 µm to about 230 µm, the angle θ is preferably in a range from about 135° to about 165°.

In addition, the removed amount of the paste 410 may be adjusted by changing the distance $d_4$ between the lower end of the squeegee 430 and the upper end of the transporting plate 420. More specifically, the pushing force is decreased by increasing the distance $d_4$, so that the strike-through ratio of the microporous layer on the rear surface of the gas diffusion layer may be decreased. On the contrary, the pushing force is increased by decreasing the distance $d_4$, so that the strike-through ratio of the microporous layer on the rear surface of the gas diffusion layer may be increased.

In addition, an air suction unit may be installed between the gas diffusion substrate 400 and the transporting plate 420 or under the transporting plate 420, and the strike-through ratio may be adjusted by exerting the suction force from the rear surface side of the gas diffusion substrate 400 to the paste 410. In other words, the strike-through ratio may be adjusted by strengthening the suction force of the air suction unit in order to increase the strike-through ratio or weakening the suction force of the air suction unit in order to decrease the strike-through ratio. In addition, the adjustment may be performed by using any one of the squeegee pressure X, the angle θ, the air suction unit, and the distance $d_4$, or the adjustment may be performed by using two or more thereof.

Example

In the case where the strike-through ratio of the microporous layer on the rear surface (second surface) of the gas diffusion layer is allowed to be changed, the corresponding change in the generated voltage (voltage characteristic) is analyzed. The membrane electrode assembly in the fuel cell is manufactured according to the following manufacturing method.

(Manufacturing Method)
<Manufacturing of Cathode Gas Diffusion Layer>

A carbon paper (TGP-H-060, manufactured by Toray Industries, Inc.) which becomes a base material of a cathode gas diffusion layer is prepared. The carbon paper is immersed into an FEP dispersion solution so that the weight ratio becomes carbon paper:FEP (tetrafluoro ethylene-hexafluoro propylene copolymer)=95:5 (for cathode), 60:40 (for anode). Next, drying is performed at a temperature of 60° C. for one hour, and after that, thermal treatment (FEP water repelling process) is performed at a temperature of 380° C. for 15 minutes. Therefore, the water repelling process is almost uniformly performed on the carbon paper.

Vulcan XC-72R (manufactured by CABOT Co., Ltd), terpineol (manufactured by KISHIDA CHEMICAL Co., Ltd) as a solvent, and Triton (manufactured by KISHIDA CHEMICAL Co., Ltd) as a nonionic surfactant are uniformly mixed by a versatile mixer (manufactured by DALTON Co., Ltd) at the room temperature for 60 minutes so that the weight ratio becomes Vulcan XC-72R:terpineol:Triton=20:150:3. As a result, the carbon paste is manufactured.

A low molecular weight fluororesin (Rubron LDW410, manufactured by Daikin Industries, Inc.) and a high molecular weight fluororesin (PTFE-31JR, manufactured by DuPont Industries, Inc.) are mixed so that the weight ratio of the fluororesins contained in the dispersion solution, low molecular weight fluororesin:high molecular weight fluororesin becomes 20:3. Therefore, a mixed fluororesin for the cathode is manufactured. The carbon paste is introduced into a container for a hybrid mixer, and cooling is performed until the temperature of the carbon paste is in a range from 10° C. to 12° C. The mixed fluororesin for the cathode is introduced into the cooled carbon paste so that the weight ratio, carbon paste:mixed fluororesin for the cathode (fluororesin component contained in the dispersion solution) becomes 31:1, and mixing is performed for 12 to 18 minutes in the mixing mode of the hybrid mixer (EC500, manufactured by KEYENCE Corporation). The timing of stopping the mixing is set to a time when the temperature of the paste becomes in a range from 50° C. to 55° C., and the mixing time is appropriately adjusted. After the temperature of the paste reaches a temperature in a range from 50° C. to 55° C., the hybrid mixer is switched from the mixing mode to the degassing mode, and the degassing is performed for 1 to 3 minutes. The degassing-finished paste is naturally cooled, so that a cathode gas diffusion layer paste is manufactured.

The cathode gas diffusion layer paste which is cooled down to the room temperature is coated on the surface of the carbon paper which is subject to the FEP water repelling process so that the coating state of the surface of the carbon paper becomes uniform. The coating method using a roll coater illustrated in FIG. 4 was used for the coating of the cathode gas diffusion layer paste. In Examples 1 to 3 and Comparative Example 1, a distance $d_1$ was 100 µm, and a thickness $d_3$ of the gas diffusion substrate 300 was 200 µm. In addition, a distance $d_2$ according to Examples 1 to 3 and Comparative Example 1 were sequentially 130 µm, 100 µm, 150 µm, and 180 µm. Drying is performed at a temperature of 60° C. for 60 minutes in a hot air drier (manufactured by Thermal Company). Finally, thermal treatment is performed at a temperature of 360° C. for two hours, so that the cathode gas diffusion layer is completed.

<Manufacturing Cathode Catalyst Slurry>

Platinum carrying carbon (TEC36F52, manufactured by TANAKA KIKINZOKU KOGYO K.K.) is used as a cathode catalyst. An SS700C solution (20%, Ew=780, water content ratio=36 wt % (25° C.), ionomer solution Aciplex (registered trade mark) SS700C manufactured by Asahi Kasei Chemicals, hereinafter, abbreviated to SS700) was used as an ion conductor. 10 mL of ultrapure water was added to 5 g of the platinum-carrying carbon, and stirring is performed. After that, 15 mL of ethanol was added. With respect to the catalyst dispersion solution, ultrasonic stirring dispersion was performed for one hour by using an ultrasonic stirrer. A predetermined SS700 solution was diluted with an equal amount of ultrapure water, and stirring was performed for three minutes by using a glass rod. After that, ultrasonic dispersion was performed for one hour by using an ultrasonic cleaner, so that an SS700 aqueous solution was obtained. Next, the SS700 aqueous solution was slowly dropped to the catalyst dispersion solution. During the dropping, stirring was continuously performed by using an ultrasonic stirrer. After the end of dropping of the SS700 aqueous solution, dropping of 10 g (weight ratio=1:1) of a mixed solution of 1-propanol and 1-butanol was performed, and the resulting solution was used as catalyst slurry. During the mixing, all the temperatures of water were adjusted to be about 60° C., so that ethanol was evaporated to be removed.

<Manufacturing of Cathode>

The cathode catalyst slurry manufactured by the above-described method was allowed to be coated on a cathode gas diffusion layer by screen printing (150 mesh). Drying was performed at a temperature of 80° C. for three hours, and thermal treatment was performed at a temperature of 180° C. for 45 minutes.

<Manufacturing of Anode Gas Diffusion Layer>

A carbon paper (TGP-H-060, manufactured by Toray Industries, Inc.) which becomes a base material of an anode gas diffusion layer is prepared. Similarly to the anode gas diffusion layer, the water repelling process is performed on the carbon paper.

Vulcan XC-72R (manufactured by CABOT), terpineol (manufactured by KISHIDA CHEMICAL Co., Ltd) as a solvent, and Triton (manufactured by KISHIDA CHEMICAL Co., Ltd) as a nonionic surfactant are uniformly mixed by a versatile mixer (manufactured by DALTON) at the room temperature for 60 minutes so that the weight ratio becomes Vulcan XC-72R:terpineol:Triton=20:150:3. As a result, the carbon paste is manufactured.

The carbon paste and the low molecular weight fluororesin are introduced into the container for the hybrid mixer so that the weight ratio becomes (carbon paste):(low molecular weight fluororesin (hereinafter, referred to as a fluororesin for the anode) (fluororesin component contained in the dispersion solution))=26:3, and mixing is performed for 15 minutes in the mixing mode of the hybrid mixer. After the mixing, the hybrid mixer is switched from the mixing mode to the degassing mode, and the degassing is performed for 4 minutes. In the case where a supernatant solution is collected in the upper portion of the degassing-finished paste, the supernatant solution is removed, and the paste is naturally cooled, so that an anode gas diffusion layer paste is completed.

The anode gas diffusion layer paste which is cooled down to the room temperature is coated on the surface of the carbon paper which is subject to the FEP water repelling process so that the coating state of the surface of the carbon paper becomes uniform, and drying is performed at a temperature of 60° C. for 60 minutes in a hot air drier (manufactured by Thermal Company). Finally, thermal treatment is performed at a temperature of 360° C. for two hours, so that the anode gas diffusion layer is completed.

<Manufacturing of Anode Catalyst Slurry>

A method of manufacturing the anode catalyst slurry is similar to the method of manufacturing the cathode catalyst slurry except that platinum-ruthenium (PtRu) carrying carbon (TEC61E54, manufactured by TANAKA KIKINZOKU KOGYO K.K.) is used as a catalyst.

<Manufacturing of Anode>

The cathode catalyst slurry manufactured by the above-described method is allowed to be coated on the anode gas diffusion layer by screen printing (150 mesh). Drying is performed at a temperature of 80° C. for three hours, and thermal treatment is performed at a temperature of 180° C. for 45 minutes.

<Manufacturing of Membrane Electrode Assembly>

Hot pressing is performed in a state where a solid polymer electrolyte membrane having a thickness of 50 µm is interposed between the anode and the cathode which are manufactured by the aforementioned methods. As a solid polymer electrolyte membrane, Aciplex (registered trade mark) (SF7202, manufactured by Asahi Kasei E Material Company) was used. The hot pressing was performed on the anode, the solid polymer electrolyte membrane, and the cathode in an attachment condition of 170° C. and 200 seconds, so that a membrane electrode assembly according to Example 1 was manufactured.

The membrane electrode assemblies according to Examples 2 and 3 and Comparative Example 1 are similar to the membrane electrode assembly according to Example 1.

(Measurement of Strike-Through Ratio)

The strike-through ratio (%) of the microporous layer in the second surface (rear surface) of the gas diffusion layer of each of the membrane electrode assemblies manufactured according to Examples 1 to 3 and Comparative Example 1 was measured. A 2-mega pixel CCD camera and an image processing apparatus CV-3500 (Keyence) were used for the measurement of strike-through ratio. First, the gas diffusion substrate coated on the microporous layer was image-captured by the CCD camera from the vertical direction in the second surface (rear surface) of the side opposite to the coated surface. The obtained image was monochromically binarized by CV-3500, so that the absolute value of the strike-through was calculated. After that, a ratio of black portions (strike-through portions) per unit area (196000 pixels) was calculated as the strike-through ratio (%).

In addition, cell voltages were measured by using the membrane electrode assemblies according to Examples 1 to 3 and Comparative Example 1. Measurement conditions were as follows.

Anode Gas: Reformed Hydrogen Gas (concentration of CO: 10 ppm)
Cathode Gas: Air
Cell Temperature: 70° C.
Humidification Temperature of Cathode Gas: 70° C.
Humidification Temperature of Anode Gas: 70° C.

Table 1 lists the strike-through values (pixels) and strike-through ratios (%) of the microporous layer and the voltage (mV) in the second surface (rear surface) of the gas diffusion layer of each of the membrane electrode assemblies manufactured by the aforementioned methods and conditions according to Examples 1 to 3 and Comparative Example 1. In Examples 1 to 3, the strike-through ratios of the cathodes were calculated. The absolute value of the strike-through denotes the number of pixels of the black portions (strike-through portions) per unit area (196000 pixels).

TABLE 1

| | Strike-Through Value (pixels) | Strike-Through Ratio (%) | Voltage (mV) |
|---|---|---|---|
| Example 1 | 3081 | 1.57 | 770 |
| Example 2 | 5959 | 3.04 | 751 |
| Example 3 | 1419 | 0.72 | 774 |
| Comparative Example 1 | 350 | 0.18 | 700 |

In Comparative Example 1 (0.18%) of which the strike-through ratio is almost equal to that of the gas diffusion layer in the related art, the generated voltage was about 700 mV. On the other hand, in Examples 1 to 3 of which the strike-through ratio was equal to or larger than 0.3%, all the voltages were equal to or higher than 750 mV, which represent very high voltage values.

Figure 6:
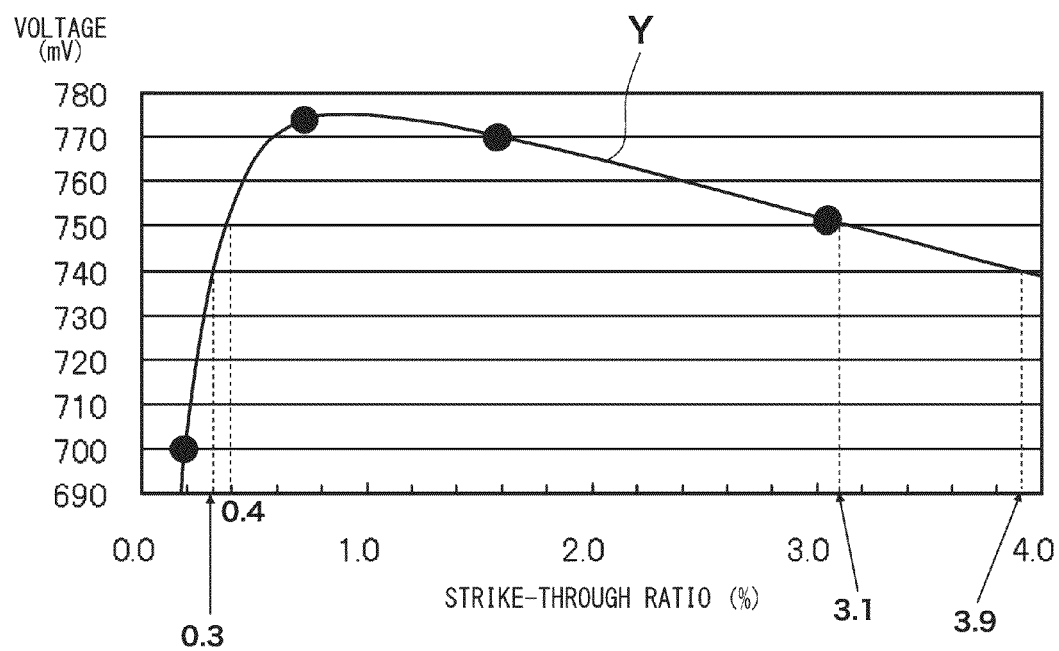
FIG. 6 is a graph illustrating a relation between a strike-though ratio of a microporous layer on a rear surface of a gas diffusion layer and a generated voltage.

FIG. 6 is a graph illustrating the relation between the strike-through ratio of the microporous layer on the second surface (rear surface) of the gas diffusion layer and the generated voltage and illustrates the relation between the strike-through ratio (%) and the voltage (mV) of Table 1.

It can be clearly understood from a curve Y of FIG. 6 that, if a gas diffusion layer of which the strike-through ratio is larger than about 0.2% is used, it is possible to generate a higher voltage than that of the fuel cell in the related art. In addition, it can be clearly understood that, in order to generate a very high voltage such as 740 mV or more, it is preferable that the gas diffusion layer of which the strike-through ratio is in a range of about 0.3% to about 3.9% be used. In addition, in order to generate a much higher voltage such as 750 mV or more, it is preferable that the gas diffusion layer of which the strike-through ratio is in a range of about 0.4% to about 3.1% be used.

The present invention is not limited to the aforementioned embodiments, but various changes in design or modifications can be made based on knowledge of the skilled persons in the art. The embodiments added with modifications can also be included in the scope of the present invention.

What is claimed is:

1. A membrane electrode assembly comprising: an electrolyte membrane;
an anode which is disposed on one surface of the electrolyte membrane; and
a cathode which is disposed on the other surface of the electrolyte membrane, wherein the anode includes an anode catalyst layer and an anode gas diffusion layer in this order from the electrolyte membrane side,
the cathode includes a cathode catalyst layer and a cathode gas diffusion layer in this order from the electrolyte membrane side,
the anode gas diffusion layer includes an anode gas diffusion substrate and an anode microporous layer which is disposed in a form where the anode microporous layer partially permeates from a first surface of the anode gas diffusion substrate in a thickness direction of the anode gas diffusion substrate and which contains a conductive powder,
the cathode gas diffusion layer includes a cathode gas diffusion substrate and a cathode microporous layer which is disposed in a form where the cathode microporous layer partially permeates from a first surface of the cathode gas diffusion substrate in a thickness direction of the cathode gas diffusion substrate and which contains a conductive powder, and
at least one of a strike-through ratio which is a ratio of occupation of a total area of a strike-through region of the anode microporous layer formed in a dotted form by allowing a portion of the anode microporous layer to reach a second surface of the anode gas diffusion substrate at the side opposite to a first surface of the anode gas diffusion substrate in the anode gas diffusion layer over an area of the second surface of the anode gas diffusion substrate, and
a strike-through ratio which is a ratio of occupation of a total area of a strike-through region of the cathode microporous layer formed in a dotted form by allowing a portion of the cathode microporous layer to reach a second surface of the cathode gas diffusion substrate at the side opposite to a first surface of the cathode gas diffusion substrate in the cathode gas diffusion layer over an area of the second surface of the cathode gas diffusion substrate, is in a range of 0.3% to 3.9%.

2. The membrane electrode assembly according to claim 1, wherein strike-through ratio is in a range of 0.4% to 3.1%.

3. A fuel cell including the membrane electrode assembly according to claim 1.

* * * * *